W. B. ERSKINE.
COUNTERSINKS.
No. 179,778.  Patented July 11, 1876.
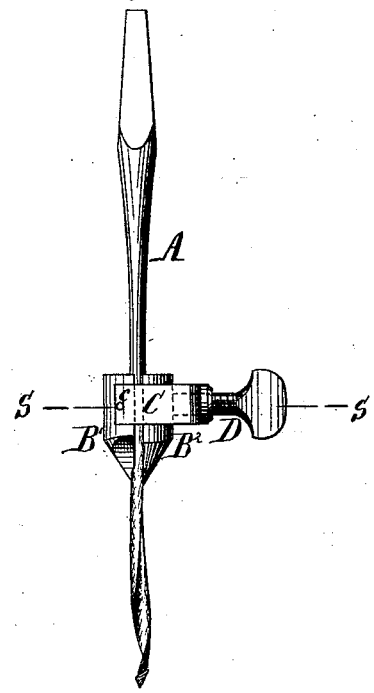
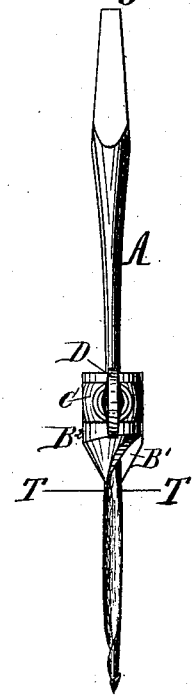
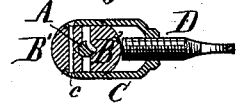
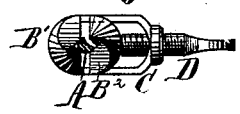
Witnesses:  Inventor:

UNITED STATES PATENT OFFICE.

WILLIAM B. ERSKINE, OF NEW YORK, N. Y.

IMPROVEMENT IN COUNTERSINKS.

Specification forming part of Letters Patent No. 179,778, dated July 11, 1876; application filed April 28, 1876.

*To all whom it may concern:*

Be it known that I, WILLIAM B. ERSKINE, of New York city, in the State of New York, have invented certain Improvements in Countersinks, of which the following is a specification:

I employ two countersinking-cutters. The outer face of each cutter is a portion of a cone, so as to afford a bearing on considerable surface. It is thus less liable to be disturbed in position by knots or other hard places. Furthermore, to avoid side pressure and strain upon the bit, consequent upon the cutting device being upon one side only, as in previous devices of this character, I deem it important that the same should be upon opposite sides, and, acting with equal force in opposite directions, the bit is firmly held in the center.

The accompanying drawings form a part of this specification, and represent what I consider the best means of carrying out the invention.

Figure 1 is a side elevation. Fig. 2 is a corresponding elevation turned quarter around. Fig. 3 is a horizontal section on the line S S; and Fig. 4 is a horizontal section on the line T T, seen from below.

Similar letters of reference indicate like parts in all the figures.

A is an ordinary bit, adapted to be turned by a suitable bit-stock or other device. (Not shown.) $B^1$ $B^2$ are two nearly corresponding cutters, formed with a groove adapted to receive the side of the bit. C is a strap firmly secured to the part $B^1$ by means of a rivet, $c$. The part $B^2$ is milled out to fit within the strap, and to move toward or away from its mate $B^1$, as required in adapting it to larger or smaller bits. D is a pinching-screw, which, on being turned, applies the parts $B^1$ $B^2$ forcibly together, clamping the device firmly upon the bit at the desired elevation. If the bit is small, the screw D requires to be turned so as to drive the parts $B^1$ $B^2$ nearly together. If the bit is large, the screw is driven in but a little way before all the parts come to a firm bearing.

The bodies of the cutters $B^1$ $B^2$ are cylindrical. The strap C is, by preference, let into both and smoothly finished; but this is not absolutely essential. The strap may, if preferred, for strength or other reasons, be allowed to extend quite around the part $B^1$, being partially or entirely let into the body of the latter or not, as may be preferred. The necessity for maintaining a clear space to allow the screw D to sweep around prevents any special advantage from being realized from reducing the dimensions on the opposite side.

The shank of the bit along that part where the countersink is usually required to be set is somewhat smaller than the hole which it has bored, and it is important to perfect work that the countersinking device be centering. A single cutter is liable, on the one hand, to draw with its cutting-edge, or, on the other hand, to be pressed away by the resistance of the material against the same.

My invention overcomes the difficulties incident to the use of a single cutter under such conditions, and insures a smooth and correct hole.

I am aware of the patent granted to F. H. Palmer, No. 112,716, February 28, 1871, and hereby disclaim the construction therein shown and described.

I claim as my invention—

The adjustable duplex countersinking device $B^1$ $B^2$, having each a groove, in combination with the holding-strap C and compressing device D, all constructed to operate as shown and described, and for the purpose specified.

In testimony whereof I have hereunto set my hand in the presence of two subscribing witnesses.

WM. B. ERSKINE.

Witnesses:
JESSE FETTIS,
WM. MILNE, Jr.